No. 635,204. Patented Oct. 17, 1899.
C. W. TAYLOR.
MUCILAGE HOLDER.
(Application filed July 15, 1899.)
(No Model.)
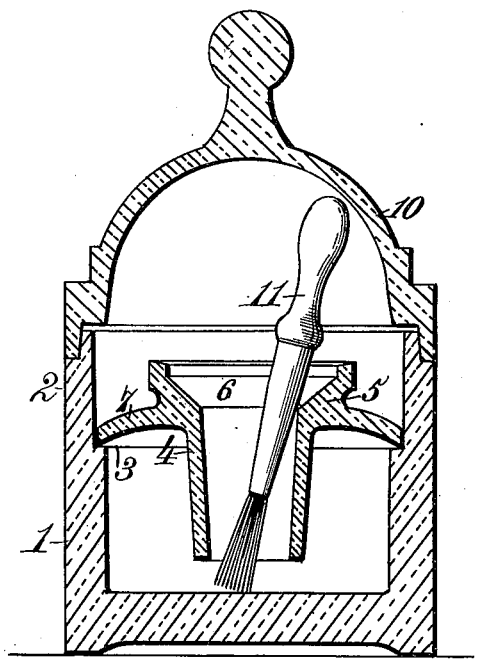
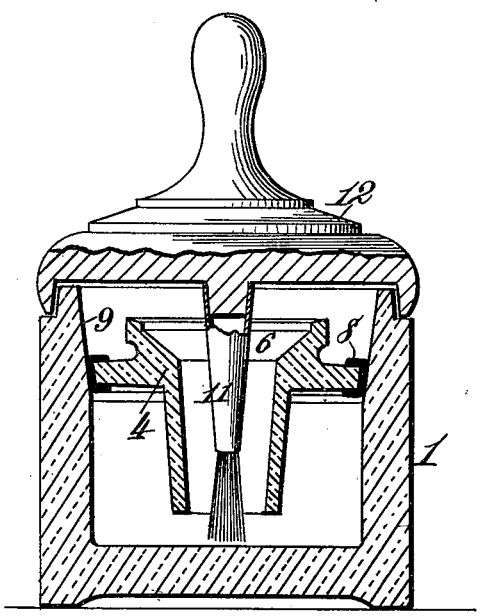
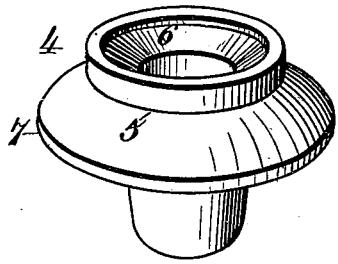
Witnesses.
Robert Everett,
F. B. Keefer
Inventor.
Clarence W. Taylor.
By James L. Norris
Atty.

UNITED STATES PATENT OFFICE.

CLARENCE W. TAYLOR, OF SIOUX CITY, IOWA.

MUCILAGE-HOLDER.

SPECIFICATION forming part of Letters Patent No. 635,204, dated October 17, 1899.

Application filed July 15, 1899. Serial No. 723,932. (No model.)

*To all whom it may concern:*

Be it known that I, CLARENCE W. TAYLOR, a citizen of the United States, residing at Sioux City, in the county of Woodbury and State of Iowa, have invented new and useful Improvements in Mucilage-Holders, of which the following is a specification.

This invention relates to mucilage-holders and includes features of construction applicable likewise to ink-wells and to receptacles for liquid glue, paints, or other similar liquids, and in which provision is made for protection of the liquid from evaporation and the access of dust and dirt.

It is one object of my invention to provide a simple and thoroughly-efficient mucilage-holder and brush-receiver in which both the mucilage-holder and brush-receiver may be easily constructed of glass, either blown or pressed, and in which the said brush-receiver may be adjustably held in the mucilage-holder at any desired point below the top or mouth of the mucilage-holder. Experience proves that in making pressed or blown glass mucilage-holders the interior diameter varies enough to render it difficult to fit therein a glass brush-receiver and wiper, partly because of the fragile character of glass and to some extent on account of the form of the respective parts. Consequently it is a special purpose of my invention to provide means whereby the glass brush-receiver is adapted to be held adjustably in position and at the same time to provide a hermetic seal at the joint between these two parts.

It is another object of my invention to make the brush-receiver removable, so as to permit ready cleaning and refilling of the mucilage-holder.

Other objects and advantages of the invention will more fully appear from the following description.

In the annexed drawings, illustrating the invention, Figure 1 is a central vertical section of one form of a mucilage-holder embodying my improvements. Fig. 2 is a central vertical section of a slightly-different form of mucilage-holder, showing the brush as fastened to and removable with the cover of the holder. Fig. 3 is a view of the detachable brush-receiver.

The mucilage-holder (designated by the reference-numeral 1) may be constructed of blow nor pressed glass, cut glass, or any suitable material and may have any required dimensions and any form, design, or configuration suited to the purpose to which the holder is to be applied. It is preferable to form the mucilage-holder from glass and to provide it with an ample base, so that it cannot be easily overturned. The mucilage-holder 1 has a very wide mouth or neck portion 2, preferably very nearly the same diameter as the body portion of the holder. In Fig. 1 I have shown this mucilage-holder 1 as being provided internally and well below its mouth with an annular ledge or shoulder 3 to provide a support for a detachable brush-receiver 4, that is extended very nearly to the bottom of the mucilage-holder. This detachable brush-receiver is located entirely within the holder and a considerable distance below the mouth thereof and is preferably constructed of glass and comprises a tubular body portion 5, having a flaring top or funnel-shaped entrance 6, that is concaved or beveled on its inner surface, as shown. Below its flaring funnel-shaped top the said brush-receiver is provided with an annular flange 7, that is adapted to rest upon the annular ledge or shoulder 3 within the mucilage-holder and against the walls of said holder, so as to form a close air-tight and water-tight joint therewith. For this purpose the said annular flange 7 may be ground on its periphery and a portion of its under side, or in lieu of providing said flange with a ground surface it may have attached thereto a gasket 8, Fig. 2, of rubber or other suitable elastic or yielding material that will provide a close hermetically-sealed joint, and thereby effectually exclude dust and dirt from the contents of the mucilage holder and prevent evaporation, except over the small space inclosed by the tubular body portion of said brush-receiver. In the cheaper form said annular flange 7 may have omitted therefrom the elastic gasket 8 when the annular shoulder 3 is wide enough to provide a sufficient rest for the flanged brush-receiver notwithstanding the variations in diameter of the glass parts, as the mucilage or adhesive liquid fills the entire space between the outer edge of the flange and interior wall of the holder and its annular shoulder, and thus makes the mucilage-holder air-tight for all practical purposes.

As economy in the construction of holders for mucilage and other liquids is a primary consideration, I deem it of great importance that according to my invention, and particularly with reference to the form shown in Fig. 1 of the drawings, the meeting faces of the annular flange 7 and the shoulder 3 at the interior of the holder need not be ground surfaces, which are more or less expensive, because the air exclusion or hermetic seal will be accomplished by the liquid which is introduced into the holder through the tubular brush-receiver, such liquid closing the air-space at the joint of the annular flange and the shoulder and forming an effectual air seal without the necessity of the employment of ground-glass surfaces or gaskets.

As shown in Fig. 2, the internal annular ledge or shoulder 3 of the mucilage-holder may be omitted and in lieu thereof the interior of the mucilage-holder may be flared or beveled downward for a distance of, say, one-half an inch, with a greater diameter at the top than at the bottom. This flared or beveled interior surface 9 of the mucilage-holder will provide a suitable support for the external annular flange of the brush-receiver 4 at any desired height and in such manner that the top of said brush-receiver will be well below the top or mouth of the mucilage-holder. If desired, the annular flange 7 may be made somewhat dome-shaped, as shown in Fig. 1, the curved upper surface of such flange being less liable to accumulate dust than a flat top flange. In either form of construction, as shown, the brush-receiver 4 is readily removable for the purpose of cleansing or to provide easy access for refilling the mucilage-holder, it being only necessary to press against one side of the top of the brush-receiver and tilt it slightly, when it may be readily withdrawn from the mucilage-holder. Obviously the upper portion of the brush-receiver may be extended any desired distance above its flange.

It will be seen that when the brush-receiver is in place, as shown in Figs. 1 and 2, its annular flange 7 forms a hermetic joint with the mucilage-holder to exclude the atmosphere and prevent access of dust and dirt. This is accomplished either by an accurate grinding of the annular flange 7 on the brush-receiver, or in a cheaply-manufactured article the gasket 8 may be provided for the same purpose and to secure a more perfect fit with mucilage-holders of varying internal diameter.

As shown in Fig. 1, the mucilage-holder may be provided with a dome-shaped cover 10, preferably constructed of glass and accurately fitted to the neck or mouth 2 of the said holder. This dome-shaped cover 10 provides ample room for inclosing the handle of the mucilage-brush 11 when the cover is in place.

It will be observed that the internally-beveled or concaved surface forming the top 6 of the brush-receiver provides a drain for the return of mucilage into the holder when the brush is wiped on said top 6 of the brush-receiver to remove surplus mucilage or other liquid. When the brush 11 is left standing in the mucilage-holder, its handle portion will be in contact with the top 6 of said receiver only at the lower edge of the concaved or beveled surface, and consequently any remains of mucilage will touch the brush-handle only to a limited extent. Therefore the brush-handle is readily kept clean and free from gumming. In using the brush any surplus of mucilage or liquid may be wiped off onto the flared portion of the receiver and will readily drain therefrom into the mucilage-holder, and the top of this brush-receiver may be utilized as a temporary rest for the brush when it is desired to lay it down for a moment without returning it to the holder. It will be observed that as this becomes a pneumatic holder, just as soon as the surplus liquid is used from the tube in the brush-receiver, after being filled, the mucilage stands near the lower end of the tube, and the dip of the brush is therefore limited to part of the brush end. When the mucilage gets below the lower end of the tube, a bubble of air enters the holder through the tube and displaces the amount of mucilage or liquid corresponding to the size of the air-bubble.

As shown in Fig. 2, the brush 11 may be formed integral with a cover 12, which may be constructed of wood or any suitable material. Obviously either form of cover 10 or 12 may be used with either form of holder shown in the drawings.

It is sometimes preferable to coat the under side of the wooden cap or cover 12 with paraffin or any suitable oily or repellent material that will prevent the mucilage or gum from adhering. Such a coating of paraffin may be applied for the same purpose to the top 6 of the brush-receiver, so that mucilage wiped thereon will not adhere.

The construction of the brush-receiver 4 from glass has a decided advantage over any similar brush-receiver constructed from metal, which is difficult to fit to the mucilage-holder and is besides very liable to corrosion from any acid or chemicals contained in the mucilage or other liquid contents of the holder.

The tubular body portion 5 of the brush-receiver should be extended very nearly to the bottom of the mucilage-holder, as shown, sufficient space being left, however, for the free entering of air-bubbles and the flow of the liquid contents of the holder. It will be obvious that should the mucilage-holder be knocked over this tubular body portion of the brush-receiver will prevent spilling of the mucilage or other liquid material.

The described construction of glass mucilage-holder and glass brush-receiver can be produced with but little expense, so cheaply, in fact, that, if desired, the device may be thrown away when the holder is emptied without keeping it for refilling. The brush-receiver being located well below the top of the mucilage-holder and providing at the same time a wiper, all liability of soiling the mouth or neck of the mucilage-holder is easily avoided with but little care in the use of the device. The brush-receiver can be readily removed for cleansing and is easily replaced, and by removing this brush-receiver the mucilage-holder can be easily cleansed and refilled whenever required. It is one of the practical advantages of my improved mucilage-holder that it can be easily and cheaply constructed of glass without the use of any material that would be liable to corrosion. By omitting the gasket there is provided a cheaper holder adapted to all practical purposes.

When the mucilage, or ink, or glue, or other liquid is poured into the mouth of the holder through the interior brush-receiver, the air is expelled from the cup or body of the holder 1 between the interior walls thereof and the outer edges of the flange 7 on the brush-receiver until the liquid reaches up to the under side of the said flange, when the mucilage or liquid fills the entire space between the outer edge of said flange and interior walls of the holder and shoulder, and thus makes the mucilage-holder air-tight, thereby providing an automatic pneumatic holder that is very simple and practical in construction and operation.

What I claim as my invention is—

1. The combination with a holder or receptacle for mucilage, or other liquid material, of a brush-receiver detachably supported within and below the mouth or neck of said holder and comprising a tubular body portion extended to near the bottom of the holder and having a flaring or funnel-shaped top and an external annular flange adapted to form a hermetically-sealed joint with the interior of said holder, substantially as described.

2. The combination with a mucilage-holder having an internal annular shoulder, of a detachable brush-receiver located entirely within the body of the holder and below the mouth thereof and comprising a tubular body portion extended to near the bottom of said holder and having a flaring or funnel-shaped top and an external annular flange adapted to rest on said annular shoulder of the holder and forming a hermetically-sealing joint therewith, substantially as described.

3. The combination with a holder for mucilage, ink, glue, or other liquid material, of a brush-receiver removably supported entirely within said holder and at a considerable distance below the mouth thereof and comprising a tubular body extended to near the bottom of said holder and provided with an external annular flange in contact with the interior wall of the holder and forming a hermetic joint therewith, substantially as described.

4. The combination of a holder or receptacle for mucilage or other liquid, and an internally-arranged removable brush-receiver located entirely below the mouth of the holder and provided with an imperforate external annular flange in contact with the internal wall of the holder for supporting the brush-receiver within the holder, all arranged so that the liquid contained in the holder forms an air seal at the point of contact of the annular flange with the interior wall of the holder.

5. The combination with a holder or receptacle for mucilage, or other liquid, of an internally-arranged brush-receiver located entirely below the mouth of the holder and provided with an external annular dome-shaped flange through which said brush-receiver is removably supported within the holder, substantially as described.

In testimony whereof I have hereunto set my hand in presence of two subscribing witnesses.

CLARENCE W. TAYLOR.

Witnesses:
O. J. TAYLOR,
R. H. BROWN.